United States Patent [19]

Masi et al.

[11] Patent Number: 5,070,051

[45] Date of Patent: Dec. 3, 1991

[54] CATALYST COMPONENT AND CATALYST FOR THE PRODUCTION OF VERY HIGH MOLECULAR WEIGHT POLYOLEFINS

[75] Inventors: Francesco Masi, San Donato Milanese; Angelo Moalli, Castelletto Ticino; Renzo Invernizzi, Milan; Francesco Menconi, Massa Macinaia; Cesare Ferrero, Monza; Stefano Malquori, Castelfiorentino; Lia Barazzoni, Piacenza; Mario Polesello, Oderzo, all of Italy

[73] Assignee: Enichem Anic S.p.A., Palermo, Italy

[21] Appl. No.: 659,533

[22] Filed: Feb. 22, 1991

Related U.S. Application Data

[63] Continuation of Ser. No. 400,988, Aug. 31, 1989, abandoned.

[30] Foreign Application Priority Data

Sep. 9, 1988 [IT] Italy ................................. 21877 A/88

[51] Int. Cl.$^5$ ............................................. C08F 4/654
[52] U.S. Cl. ........................................ 502/9; 502/111; 502/117; 526/125
[58] Field of Search ............................ 502/9, 111, 117

[56] References Cited

U.S. PATENT DOCUMENTS

| | | | |
|---|---|---|---|
| 3,113,115 | 12/1963 | Ziegler et al. | 502/183 |
| 3,849,334 | 11/1974 | Frielingsdorf et al. | 502/117 X |
| 3,992,322 | 11/1976 | Dombro et al. | 502/117 X |
| 4,421,674 | 12/1983 | Invernizzi et al. | 502/9 |
| 4,481,342 | 11/1984 | Invernizzi et al. | 502/125 X |
| 4,843,049 | 6/1989 | Invernizzi et al. | 502/9 |

*Primary Examiner*—Patrick P. Garvin
*Attorney, Agent, or Firm*—Hedman, Gibson, Costigan & Hoare

[57] ABSTRACT

A solid catalyst component for the low-pressure polymerization of ethylene and $C_3$-$C_{10}$ alpha-olefins into very high molecular weight polyolefins is in the form of a spherical granular solid having a surface area of between 20 and 40 $m^2/g$, a mean pore radius of between 5,000 and 40,000 Å and a porosity of between 40 and 90 vol %, and is definable by the following formula (in atomic proportions:

X (1), Mg (1-8), Al (0.2-0.8), Cl (5-20), (Et+OEt+OR) (1-3);

where: X=Hf or Zr; Et=ethyl group; OEt=ethoxy group; and OR=alkoxy group containing from 2 to 8 carbon atoms in the linear or branched alkyl portion.

Such a catalyst component is obtained by preparing a solid spherical granular support by spray-drying an ethanolic solution of magnesium chloride, reacting said support with a hafnium or zirconium alkoxide or halogenalkoxide, and finally reacting the thus treated support with an alkyl aluminum chloride.

7 Claims, No Drawings

CATALYST COMPONENT AND CATALYST FOR THE PRODUCTION OF VERY HIGH MOLECULAR WEIGHT POLYOLEFINS

This application is a continuation of Ser. No. 400,988, filed Aug. 31, 1989 and now abandoned.

This invention relates to a solid catalyst component and a catalyst which are active in the low-pressure polymerization of ethylene and $C_3-C_{10}$ alpha-olefins, to produce polyolefins of very high molecular weight. The invention also relates to polymerization processes using said catalyst component and catalyst.

It is known in the art to polymerize ethylene or general alpha-olefins by the low-pressure Ziegler process. For this purpose catalysts are used generally formed from a compound of group IV to group VI elements of the periodic table (transition metal compounds), mixed with an organometallic compound or hydride of group I to group III elements of the period table, operating in solution, in suspension or in the gaseous phase. Catalysts are also known in which the transition metal is fixed to a solid organic or inorganic support which has possibly been physically and/or chemically treated. One of these supports is a microspheroidal granular solid obtained by spray-drying alcoholic magnesium chloride solutions, as described for example in U.S. Pat. Nos. 4,421,674 and 4,481,342 and in U.S. patent application Ser. No. 150,744 filed on Feb. 1, 1988 and now U.S. Pat. No. 4,843,049.

The transition metal generally used in these catalysts is titanium, which results in high yields and high productivity, especially in ethylene polymerization. Use is also made of combinations of titanium with other transition metals, and especially vanadium, zirconium or hafnium in the preparation of ethylene polymers or copolymers with particular characteristics, as described for example in U.S. Pat. Nos. 4,109,071, 4,154,701, 4,192,772, 4,210,559, 4,226,964, 4,245,071 and 4,663,404, and in European patent applications, publication Nos. 19,637 and 57,050.

There is a currently felt need in the art for olefinic polymers of very high molecular weight for use as engineering polymers as substitutes for wood and metal. Catalysts of the known art are hardly suitable for producing such polyolefins, and especially for the polymerization of high molecular weight alpha-olefins which are liquid at ambient temperature such as 4-methyl-1-pentene, 1-hexene and 1-octene.

The object of the present invention is to overcome this deficiency in the state of the art by providing a catalyst component and catalyst which are active in low pressure olefin polymerization and are able to produce olefinic polymers of very high molecular weight even starting from alpha-olefins which are liquid at ambient temperature.

On this basis, according to a first aspect, the present invention provides a catalyst component for the low-pressure polymerization of ethylene and $C_3-C_{10}$ alpha-olefins to polyolefins of very high molecular weight, said component being in the form of a spherical granular solid in which at least about 80% of the granules have a size of between 30 and 40 microns, and having a surface area of between 20 and 40 $m^2/g$, a mean pore radius of between 5,000 and 40,000 Å and a porosity of between 40 and 90 vol %, and being definable by the following formula (in atomic proportions):

$$X(1), Mg(1-8), Al(0.2-0.8), Cl(5-20), (Et+OEt+OR)(1-3);$$

where:
X = Hf or Zr,
Et = ethyl group,
OEt = ethoxy group,
OR = alkoxy group containing from 2 to 8 carbon atoms in the linear or branched alkyl portion.

Preferably, in the solid catalyst component according to the present invention X represents Hf and OR represents the n-butoxy group.

According to a second aspect, the present invention provides a catalyst for the polymerization of ethylene and $C_3-C_{10}$ alpha-olefins to polyolefins of very high molecular weight, which comprises the aforesaid solid catalyst component in association with a trialkyl aluminium or an alkyl aluminium chloride. According to a further aspect the present invention provides a process for preparing the solid catalyst component, comprising the following steps conducted in succession:

spray drying an ethanolic magnesium chloride solution to form a spherical granular solid support containing 5–30% w/w of alcoholic hydroxyls (expressed as ethanol), and preferably 20–25% w/w;

reacting said support, suspended in an inert liquid, with a hafnium or zirconium compound chosen from those hafnium or zirconium alkoxides and halogenalkoxides containing from 2 to 8 carbon atoms in the linear or branched alkyl portion, operating at a temperature of between 40° and 100° C. for a time of between 0.5 and 4 hours, with an atomic Mg/Hf or Zr ratio of between 0.5/1 and 8/1;

reacting the support treated in this manner with an alkyl aluminium chloride containing from 2 to 8 carbon atoms in the linear or branched alkyl portion, operating at a temperature of between 60° and 120° C. for a time of between 0.5 and 5 hours, with a ratio of chlorine atoms in the alkyl aluminium chloride to alkoxy groups of between 1/1 and 5/1;

recovering the solid catalyst component from the relative suspension.

According to a further aspect the invention relates to the use of the solid catalyst component and catalyst in the low-pressure polymerization of ethylene and $C_3-C_{10}$ alpha-olefins in the production of polyolefins and relative copolymers of very high molecular weight.

PREPARATION OF THE SUPPORT

In preparing the support, according to the present invention, magnesium chloride which is anhydrous or contains only a small quantity of water (preferably less than about 1% w/w) is dissolved in ethanol and the solution obtained is spray-dried in a spray dryer. The solution is sprayed by a nozzle or other equivalent device into the evaporation chamber of a spray dryer, the liquid spray being brought into contact with a nitrogen stream of very high purity fed into the evaporation chamber in countercurrent or cocurrent. Generally the procedure is carried out with the gaseous stream at an inlet temperature of the order of 200°–400° C. and outlet temperature of 140°–250° C., a temperature difference between the inlet and outlet of at least 40° C. being maintained.

According to a particular embodiment, an additional liquid compound with an atmospheric pressure boiling point exceeding that of ethanol is added to the ethanolic magnesium chloride solution and is normally chosen from aliphatic (such as heptane), cycloaliphatic or aromatic hydrocarbons, or from hydroxylated polar organic compounds or esters.

By operating under the aforesaid conditions it is possible to recover from the spray dryer a granular solid which can be used as a support for the solid catalyst component, and typically having the following characteristics:

particle shape: spherical with about 80% of the particles having a size of between 30 and 40 microns;
apparent particle density: between 0.2 and 0.3 g/ml;
surface area: between 30 and 100 m$^2$/g;
average pore radius: between 100,000 and 150,000 Å;
porosity: between 40 and 80 vol %;
alcoholic hydroxyl content: between 5 and 30% w/w (expressed as ethanol) and preferably of the order of 20–25% w/w.

PREPARATION OF THE SOLID CATALYST COMPONENT

According to the present invention the solid support obtained as heretofore described is suspended in an inert organic liquid, and the suspension obtained is brought into contact under reaction conditions firstly with a hafnium or zirconium compound soluble in the reaction medium and then with an alkyl aluminium chloride. In particular, for this purpose the solid support is suspended in an inert organic liquid, especially a liquid aliphatic hydrocarbon containing from 6 to 12 carbon atoms in the molecule, such as decane, to the suspension obtained in this manner there being added a hafnium or zirconium compound soluble in the liquid medium and generally chosen from hafnium and zirconium alkoxides and halogen alkoxides. Hafnium or zirconium tetraalkoxides containing from 2 to 8 carbon atoms in the linear or branched alkyl portion are preferred for this purpose, such as hafnium or zirconium tetra-ethoxide, tetra-n-propoxide, tetra-iso-propoxide, tetra-n-butoxide and tetra-iso-butoxide. Hafnium and zirconium tetra-n-butoxides are particularly preferred. The hafnium or zirconium compounds are conveniently added to the support suspension after initial dilution in the same inert organic liquid. In this reaction an atomic ratio of the magnesium in the support to the hafnium or zirconium in the hafnium or zirconium compound of between 0.5/1 and 8/1 is maintained. The reaction is conducted at a temperature in the range of 40°–100° C. for a time dependent on the chosen temperature and in any event between 0.5 and 4 hours. According to the present invention, an alkyl aluminium chloride containing from 2 to 8 carbon atoms in the alkyl portion and chosen from dialkyl aluminium monochlorides, monoalkyl aluminium dichlorides and alkyl aluminium sesquichlorides is added to the suspension obtained after reacting the support with the hafnium or zirconium compound. Of these alkyl aluminium chlorides ethyl aluminium sesquichloride is preferred. Conveniently the alkyl aluminium chlorides are added after dilution in the same inert organic liquid as used to form the suspension. In the reaction a ratio of chlorine atoms in the alkyl aluminium chloride to the total content of alkoxy groups (orginating from the ethanol and the hafnium or zirconium compounds) of between 1/1 and 5/1 and preferably of the order of 3/1 is maintained. The reaction temperature can vary from 60° to 120° C. The reaction time depends on the chosen temperature and can generally vary from 0.5 to 5 hours. Preferably the process is conducted at a temperature of the order of 90° C. for a time of about 2 hours. In this manner the solid catalyst component according to the present invention is obtained, and can be separated from the suspension by normal filtering, centrifuging or decanting methods, and then washed with inert organic liquids, preferably aliphatic hydrocarbons. The solid catalyst component has the previously stated composition and characteristics.

The Catalyst

The catalyst according to the present invention is formed from the described solid component plus a trialkyl aluminium or an alkyl aluminium chloride which contain from 2 to 8 and preferably 2 to 4 carbon atoms in the alkyl part. Triethyl aluminium and triisobutyl aluminium are preferred. Conveniently, in the catalyst of the present invention the atomic ratio of the aluminium (in the trialkyl aluminium or alkyl aluminium chloride) to the hafnium or zirconium (in the solid catalyst component) is maintained between 5/1 and 50/1. The upper limit of this range is not critical and is dictated mainly by economic reasons.

USE OF THE CATALYST

The catalysts of the present invention are active in the low-pressure polymerization and copolymerization of ethylene and alpha-olefins containing from 3 to 10 carbon atoms, of either linear or branched chain type, to give polyolefins of very high molecular weight. Examples of such alpha-olefins are 4-methyl-1-pentene, 1-hexene and 1-octene. The polymerization is conveniently conducted in suspension in an inert organic solvent at a temperature generally variable from 20° to 100° C. In the case of olefins which are gaseous at ambient temperature, it is convenient to operate at higher than ambient temperature and pressure, possibly in the presence of hydrogen. In the case of olefins which are liquid under ambient conditions it is convenient to operate at low temperature, at atmospheric pressure and in the absence of hydrogen. The polyolefins obtained possess a high degree of stereoregularity in all cases.

In particular, in the case of ethylene it is possible to prepare polymers with an intrinsic viscosity (measure in trichlorobenzene at 135° C.) typically of the order of 10 with catalysts containing hafnium, and of the order of 4 with catalysts containing zirconium. Under comparable conditions catalysts containing titanium produce polyethylenes with an intrinsic viscosity of the order of 1.5. In the case of 4-methyl-1-pentene it is possible to prepare polymers with an intrinsic viscosity (measured in decalin at 135° C.) typically of the order of 10–15 with catalysts containing hafnium, and of the order of 7–10 with catalysts containing zirconium. Under comparable conditions catalysts containing titanium produce poly(4-methyl-1-pentenes) with an intrinsic viscosity of the order of 4.5. In the case of 1-hexene it is possible to prepare polymers with an intrinsic viscosity (measured in tetrahydrofuran at 25° C.) typically of the order of 7–12, the poly(1-hexenes) obtained having a glass transition temperature of about −50° C. and two melting points at about 135° and 165° C. Under comparable conditions catalysts containing zirconium produce poly(1-hexenes) with an intrinsic viscosity of the order of 5 and those containing titanium produce poly(1-hexenes) with an intrinsic viscosity of the order of 3. These latter have a glass transition temperature of the order of −50° C. but no melting points.

The polyolefins obtained by the process of the present invention are particularly useful as high modulus products usable technically as engineering polymers, for example as substitutes for wood and metal.

Experimental examples are given hereinafter to better illustrate the present invention.

EXAMPLE 1

33 kg of commercial magnesium chloride, with a water content of about 0.07% w/w and in the form of flakes with a diameter of between 0.1 and 2 mm, are dispersed in 100 liters of heptane, and 55 kg of ethanol are added to the obtained suspension while keeping the mass stirring in a steel autoclave. The reaction mixture is stirred at 130° C. under a nitrogen pressure, to obtain a uniform emulsion which is fed at the said temperature into an industrial spray dryer, in this case a closed cycle dryer of the NIRO Company. The emulsion is fed into this apparatus through a hydraulic nozzle with a 0.7 mm orifice and 60° C. spray cone angle, by which it is reduced to separate liquid particles. The feed pressure is 7 kg/cm$^2$ and hourly throughput 15 liters/hour of emulsion. The inlet nitrogen stream has a temperature of 250° C. and the outlet gas stream a temperature of 160° C., with a nitrogen throughput of about 200 m$^3$/hour, calculated under normal conditions.

By operating under these conditions, a granular solid is recovered from the bottom of the reactor with the following characteristics:
particle shape: spherical with 80% of the particles having a size of between 30 and 40 microns;
apparent particle density: 0.28 g/ml:
alcoholic hydroxyl content: 22% w/w expressed as ethanol;
surface area: 32 m$^2$/g;
average pore radius: 150,000 Å;
porosity: 55 vol %.

2.45 g of the support obtained in the above manner are suspended in 100 ml of n-decane, operating in a 250 ml reactor. 11.1 g of hafnium tetra-n-butoxide [Hf(O-Bu)$_4$] (Mg/Hf atomic ratio=1/1) are added and the suspension heated to 60° C. for 60 minutes. After this period the suspension is cooled to 30° C., and 24 g of ethyl aluminium sesquichloride [ratio of chlorine atoms of the ethyl aluminium sesquichloride to alkoxy groups (OEt+OBu)=3/1] diluted in 70 g of n-decane are gradually added dropwise. On termination of the addition the suspension is heated to 90° C. for 120 minutes. The solid is decanted and washed with three 100 ml portions of n-decane. In this manner 7.8 g of the solid catalyst component are obtained having the following characteristics:
hafnium content: 33.6% w/w expressed as metal;
particle shape and size: similar to the support;
apparent density: similar to the support:
surface area: 34 m$^2$/g;
average pore radius: 15,000 Å;
porosity: 86 vol %.

Such a catalyst component contains, in weight percent terms, hafnium 33.6%, magnesium 6.4%, aluminium 1.5%, chlorine 41.5%, organic fraction 17%.

Expressing the aforesaid constituents in atomic proportions, the solid catalyst component can be represented by the formula:

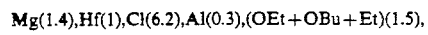

Mg(1.4),Hf(1),Cl(6.2),Al(0.3),(OEt+OBu+Et)(1.5),

OEt and OBu being present in quantities of 0.9% and 3.6% w/w in the catalyst component respectively.

EXAMPLE 2

2.45 g of the support obtained as described in Example 1 are suspended in 100 ml of n-decane, operating in a 250 ml reactor. 7.7 g of zirconium tetra-n-butoxide (Mg/Zr atomic ratio=1/1) are added and the suspension heated to 60° C. for 60 minutes. After this period the suspension is cooled to 30° C., and 23 g of ethyl aluminium sesquichloride [ratio of chlorine atoms of the ethyl aluminium sesquichloride to alkoxy groups (OEt+OBu)=3/1] diluted in 65 g of n-decane are gradually added dropwise. On termination of the addition the suspension is heated to 90° C. for 120 minutes. The solid is decanted and washed with three 100 ml portions of n-decane. In this manner 8.2 g of the solid catalyst component are obtained having the following characteristics:
zirconium content: 22.2% w/w expressed as metal;
particle shape and size: similar to the support;
apparent density: similar to the support;
surface area: 32 m$^2$/g;
average pore radius: 5,000 Å;
porosity: 67 vol %.

Such a catalyst component contains, in weight percent terms, zirconium 22.2%, magnesium 6.5%, aluminium 2%, chlorine 50.3%, organic fraction 19%.

Expressing the aforesaid constituents in atomic proportions, the solid catalyst component can be represented by the formula:

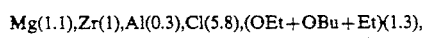

Mg(1.1),Zr(1),Al(0.3),Cl(5.8),(OEt+OBu+Et)(1.3),

OEt and OBu being present in quantities of 1.1% and 3.9% w/w in the catalyst component respectively.

EXAMPLE 3

13 g of the support obtained as described in Example 1 are suspended in 100 ml of n-decane, operating in a 250 ml stirred reactor. 6.4 g of hafnium tetra-n-butoxide (Mg/Hf atomic ratio=8/1) are added and the resultant suspension heated to 100° C. for 30 minutes. After this period the suspension is cooled to 30° C., and 38 g of ethyl aluminium sesquichloride [ratio of chlorine atoms of the ethyl aluminium sesquichloride to alkoxy groups (OEt+OBu)=3/1] diluted in 120 g of n-decane are gradually added dropwise.

The solid is decanted and washed with three 200 ml portions of n-decane. In this manner 14.5 g of the solid catalyst component are obtained having the following characteristics:
hafnium content: 16.5% w/w expressed as metal;
particle shape and size: similar to the support;
apparent density: similar to the support;
surface area: 20 m$^2$/g;
average pore radius: 30,000 Å;
porosity: 83 vol %.

Such a catalyst component contains, in weight percent terms, hafnium 16.5%, magnesium 16.0%, aluminium 1.5%, chlorine 60.2%, organic fraction 6%.

Expressing the aforesaid constituents in atomic proportions, the solid catalyst component can be represented by the formula:

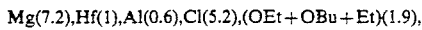

Mg(7.2),Hf(1),Al(0.6),Cl(5.2),(OEt+OBu+Et)(1.9),

OEt and OBu being present in quantities of 0.6% and 2.4% w/w in the catalyst component respectively.

EXAMPLE 4

16.3 g of the support prepared as described in Example 1 are suspended in 250 ml of n-decane, operating in a 500 ml stirred reactor. 13.0 g of zirconium tetra-n-butoxide (Mg/Zr atomic ratio =4/1) are added and the suspension heated to 80° C. for 30 minutes. After this period the suspension is cooled to 30° C., and 53 g of ethyl aluminium sesquichloride [ratio of chlorine atoms of the ethyl aluminium sesquichloride to alkoxy groups (OEt+OBu)=3/1] diluted in 180 g of n-decane are gradually added dropwise. On termination of the addition the suspension is heated to 90° C. for 120 minutes. The solid is decanted and washed with three 200 ml portions of n-decane. In this manner 21 g of the solid catalyst component are obtained having the following characteristics:
particle shape and size: similar to the support;
apparent density: similar to the support;
surface area: 35.7 m²/g;
average pore radius: 30,800 Å;
porosity: 73 vol %.

Such a catalyst component contains, in weight percent terms, zirconium 13.8%, magnesium 13.4%, aluminium 1.4%, chlorine 59.8%, organic fraction 11.6%.

Expressing the aforesaid constituents in atomic proportions, the solid catalyst component can be represented by the formula:

Mg(3.72),Zr(1),Al(0.35),Cl(11.2),(OEt-+OBu+Et)(1.29),

OEt and OBu being present in quantities of 1.4% and 3.1% w/w in the catalyst component respectively.

EXAMPLE 5 (comparison)

2.45 g of the support prepared in Example 1 are suspended in 100 ml of n-decane, operating in a 250 ml stirred reactor. 7.0 g of titanium tetra-n-butoxide (Mg/Ti atomic ratio=1/1) are added and the resultant suspension heated to 60° C. for 60 minutes. After this period the suspension is cooled to 30° C., and 23 g of ethyl aluminium sesquichloride [ratio of chlorine atoms of the ethyl aluminium sesquichloride to alkoxy groups. (OEt+OBu)=3/1] diluted in 65 g of n-decane are gradually added dropwise. On termination of the addition the suspension is heated to 90° C. for 120 minutes. The solid is decanted and washed with three 100 ml portions of n-decane. In this manner 7 g of the solid catalyst component are obtained having the following characteristics:
titanium content: 14% w/w expressed as metal;
particle shape and size: similar to the support;
apparent density: similar to the support;
surface area: 37 m²/g;
average pore radius: 9,000 Å;
porosity: 68 vol %.
ratio of trivalent titanium to the sum of trivalent and tetravalent titanium: 0.94/1.

Such a catalyst component contains, in weight percent terms, zirconium 14%, magnesium 7.8%, aluminium 3.2%, chlorine 54.0%, organic fraction 21%.

Expressing the aforesaid constituents in atomic proportions, the solid catalyst component can be represented by the formula:

Mg(1.1),Ti(1),Al(0.4),Cl(5.2), (OEt+OBu+Et)(1.2),

OEt and OBu being present in quantities of 1.3% and 4.1% w/w in the catalyst component respectively.

EXAMPLE 6

40 ml of anhydrous n-heptane, 5 g of 4-methyl-1-pentene, 0.6 g of triisobutyl aluminium and 0.105 g of the solid catalyst component of Example 1 are introduced in that order into a 100 ml stirred reactor. The atomic ratio of the aluminium in the triisobutyl aluminium to the hafnium is therefore 15/1. Polymerization is carried out at 25° C. for 20 hours. After this period the polymerization is interrupted by introducing into the reactor 4 ml of a 10% w/w alcoholic solution of ionol (2,6-di-t-butyl-p-cresol). The polymer formed is coagulated in 100 ml of a solution containing 95% w/w of ethanol and 5% w/w of a 37% w/w aqueous hydrochloric acid solution. After drying under vacuum in an oven at 50° C., 4.0 g of poly(4-methyl-1-pentene) are obtained in accordance with the following values:
productivity: 40 g, expressed as grams of polymer per gram of solid catalyst component,
yield: 115 g, expressed as grams of polymer per gram of hafnium in the solid catalyst component,
conversion: 80%, expressed as percentage of monomer converted into polymer.

The poly(4-methyl-1-pentene) produced in this manner has the following characteristics:
intrinsic viscosity: $[\eta]=11$ dl/g, measured in decalin at 135° C.,
number-average molecular weight: Mn=740,000, calculated in accordance with the equation:

$$[\eta]^{135°}\, C_{DEC}=1.94\times10^{-4}\times(Mn)^{0.81}$$

[ref: A. S. Hoffman, B. A. Fries, P. C. Condit, J. Polym. Sci. Symp., 4, 109 (1963)],
isotacticity index: 99.1%, expressed as the percentage quantity of polymer unextractable in boiling diethyl ether.

EXAMPLE 7

80 ml of anhydrous n-heptane, 10 g of 4-methyl-1-pentene, 0.4 g of triisobutyl aluminium and 0.21 g of the solid catalyst component prepared as in Example 1 are introduced in that order into a 150 ml stirred reactor. The atomic ratio of the aluminium in the triisobutyl aluminium to the hafnium is therefore 5/1. The procedure of Example 6 is followed, polymerizing at 25° C. for 6 hours. 2.7 g of poly(4-methyl-1-pentene) are obtained with:
productivity: 13.5 g
yield: 38 g (evaluated on the hafnium),
conversion: 27%.

The polymer has the following characteristics: determined as in Example 6:
intrinsic viscosity: 18 dl/g,
number-average molecular weight: 1,250,000,
isotacticity index: 98.1%

EXAMPLE 8

40 ml of anhydrous n-heptane, 5 g of 4-methyl-1-pentene, 1.2 g of triisobutyl aluminium and 0.105 g of the solid catalyst component prepared as described in Example 1 are introduced in that order into a 100 ml stirred reactor. The atomic ratio of the aluminium in the triisobutyl aluminium to the hafnium is therefore 30/1. The procedure of Example 6 is followed, polymerizing at 60° C. for 15 hours. 2.8 g of poly(4-methyl-1-pentene) are obtained with:
productivity: 26.6 g
yield: 78.6 g (evaluated on the hafnium),
conversion: 57%.

The polymer has the following characteristics: determined as in Example 6:
intrinsic viscosity: 7.8 dl/g,
number-average molecular weight: 470,000,
isotacticity index: 92.5%

EXAMPLE 9

40 ml of anhydrous n-heptane, 5 g of 4-methyl-1-pentene, 0.6 g of triisobutyl aluminium and 0.081 g of the solid catalyst component prepared as described in Example 2 are introduced in that order into a 100 ml stirred reactor. The atomic ratio of the aluminium in the triisobutyl aluminium to the zirconium is therefore 15/1. The procedure of Example 4 is followed, polymerizing at 25° C. for 20 hours. 4.6 g of poly(4-methyl-1-pentene) are obtained with:
productivity: 56.7 g
yield: 255 g (evaluated on the zirconium),
conversion: 92%.

The polymer has the following characteristics, determined as in Example 6:
intrinsic viscosity: 7.0 dl/g,
number-average molecular weight: 420,000.

EXAMPLE 10 (comparison)

40 ml of anhydrous n-heptane, 5 g of 4-methyl-1-pentene, 1.2 g of triisobutyl aluminium and 0.07 g of the solid catalyst component prepared as described in Example 5 are introduced in that order into a 100 ml stirred reactor. The atomic ratio of the aluminium in the triisobutyl aluminium to the titanium is therefore 30/1. The procedure of Example 6 is followed, polymerizing at 25° C. for 20 hours. 4.7 g of poly(4-methyl-1-pentene) are obtained with:
productivity: 67 g
yield: 489.6 g (evaluated on the titanium),
conversion: 94%.

The polymer has the following characteristics, determined as in Example 6:
intrinsic viscosity: 4.5 dl/g,
number-average molecular weight: 240,000,
isotacticity index: 71.5%.

EXAMPLE 11

400 ml of anhydrous n-heptane, 50 g of 1-hexane, 12 g of triisobutyl aluminium and 1.0 g of the solid catalyst component prepared as described in Example 1 are fed in that order into a 1000 ml stirred reactor. The atomic ratio of the aluminium in the triisobutyl aluminium to the hafnium is therefore 30/1. Polymerization is carried out at 60° C. for 6 hours. After this period the polymerization is interrupted by introducing into the reactor 4 ml of a 10% w/w alcoholic solution of ionol. The polymer formed is coagulated with 250 ml of a solution containing 95% w/w of ethanol and 5% w/w of a 37% w/w aqueous hydrochloric acid solution. After drying under vacuum in an oven at 50° C., 25.0 g of poly(1-hexene) are obtained in accordance with the following values:
productivity: 25 g,
yield: 73.5 g (evaluated on the hafnium),
conversion: 50%, The poly(1-hexene) produced in this manner has the following characteristics:
intrinsic viscosity: $[\eta] = 5.9$ dl/g, measured at 25° C. in tetrahydrofuran (THF),
weight-average molecular weight: Mw=2,400,000, calculated in accordance with the equation:

$$[\eta]^{25°\ C.}{}_{THF} = 2.32 \times 10^{-4} \times (MW)^{0.69}$$

[ref: F. C. Lin, S. S. Stivala and A. Besenberger, J. Appl. Polym. Sci., 17, 1073–1090 (1973)].

The polymer is also subjected to differential thermal analysis using the METTLER TA3000 instrument, giving the following characteristics:
Tg (glass transition temperature): −46° C.
M.P. (1): 135° C.
M.P. (2): 165° C.

The poly(1-hexene) therefore possesses elastomeric characteristics.

EXAMPLE 12

350 ml of anhydrous n-heptane, 35 g of 1-hexene, 1.6 g of triisobutyl aluminium and 0.4 g of the solid catalyst component prepared as described in Example 1 are fed in that order into a 1000 ml stirred reactor. The atomic ratio of the aluminium in the triisobutyl aluminium to the hafnium is therefore 10/1. The procedure of Example 11 is followed, polymerizing at 25° C. for 5 hours, to obtain 10.3 g of poly(1-hexene) with:
productivity: 25.8 g,
yield: 73.6 g (evaluated on the hafnium),
conversion: 30%

The polymer also has the following characteristics, determined as in Example 11:
intrinsic viscosity: 10.5 dl/g,
weight-average molecular weight: 5,100,000:
Tg: −46° C.
M.P. (1): 135° C.
M.P. (2): 165° C.

EXAMPLE 13

350 ml of anhydrous n-heptane, 35 g of 1-hexene, 1.6 g of triisobutyl aluminium and 0.33 g of the solid catalyst component prepared as described in Example 2 are fed in that order into a 1000 ml stirred reactor. The atomic ratio of the aluminium in the triisobutyl aluminium to the zirconium is therefore 10/1. The procedure of Example 11 is followed, polymerizing at 25° C. for 5 hours, to obtain 12 g of poly(1-hexene) with:
productivity: 36.4 g,
yield: 164.8 g (evaluated on the zirconium),
conversion: 34.3%.

The polymer also has the following characteristics, determined as in Example 11:
intrinsic viscosity: 12.5 dl/g,
weight-average molecular weight: 3,200,000:
Tg: −46° C.
melting points: not determined.

EXAMPLE 14

90 ml of anhydrous n-heptane, 10 g of 1-hexene, 0.5 g of triisobutyl aluminium and 0.26 g of the solid catalyst component prepared as described in Example 3 are introduced in that order into a 250 ml stirred reactor. The atomic ratio of the aluminium in the triisobutyl aluminium to the hafnium is therefore 10/1. The procedure of Example 11 is followed, polymerizing at 25° C. for 4.5 hours, to obtain 7.61 g of poly(1-hexene) with:

productivity: 29.3 g,
yield: 176.2 g (evaluated on the hafnium),
conversion: 76.1%.

The polymer also has the following characteristics, determined as in Example 11:
intrinsic viscosity: 8.7 dl/g,
weight-average molecular weight: 2,100,000.

EXAMPLE 15

150 ml of anhydrous n-heptane, 25 g of 1-hexene, 1.2 g of triisobutyl aluminium and 0.37 g of the solid catalyst component prepared as described in Example 4 are introduced in that order into a 250 ml stirred reactor. The atomic ratio of the aluminium in the triisobutyl aluminium to the zirconium is therefore 10/1. The procedure of Example 11 is followed, polymerizing at 25° C. for 22 hours, to obtain 14.8 g of poly(1-hexene) with:
productivity: 37.9 g,
yield: 274 g (evaluated on the zirconium),
conversion: 59.0%.

The polymer also has the following characteristics, determined as in Example 11:
intrinsic viscosity: 10.8 dl/g,
weight-average molecular weight: 2,700,000.

EXAMPLE 16

150 ml of anhydrous n-heptane, 25 g of 1-octene, 0.9 g of triisobutyl aluminium and 0.48 g of the solid catalyst component prepared as described in Example 3 are introduced in that order into a 250 ml stirred reactor. The atomic ratio of the aluminium in the triisobutyl aluminium to the hafnium is therefore 10/1. The procedure of Example 11 is followed, polymerizing at 25° C. for 21 hours, to obtain 22.5 g of poly(1-octene) with:
productivity: 46.87 g,
yield: 284.8 g (evaluated on the hafnium),
conversion: 90.0%.

The polymer also has an intrinsic viscosity of 7.2, determined as in Example 11.

EXAMPLE 17 (comparison)

400 ml of anhydrous n-heptane, 50 g of 1-hexene, 3.6 g of triisobutyl aluminium and 0.21 g of the solid catalyst component prepared as described in Example 5 are fed in that order into a 1000 ml stirred reactor. The atomic ratio of the aluminium in the triisobutyl aluminium to the titanium is therefore 30/1. The procedure of Example 11 is followed, polymerizing at 60° C. for 3 hours, to obtain 33 g of poly(1-hexene) with:
productivity: 157.0 g,
yield: 1139 g (evaluated on the titanium),
conversion: 66%.

The polymer also has the following characteristics, determined as in Example 11:
intrinsic viscosity: 1.4 dl/g,
weight-average molecular weight: 310,000:
Tg: $-46°$ C.
melting points: absent.

EXAMPLE 18

1900 ml of anhydrous hexane, 1.2 g of triisobutyl aluminium and 0.12 g of the solid catalyst component prepared as in Example 1 are introduced in that order into a 5 liter stirred reactor. The reactor temperature is raised to 85° C. and the reactor pressurized with hydrogen to 8 ata. Ethylene is then fed to a pressure of 11 ata (hydrogen/ethylene molar ratio=3.5) and this pressure is maintained for the next 4 hours by continuously feeding ethylene. After this period the polymerization is interrupted by introducing into the reactor 20 ml of a 10% w/w alcoholic solution of ionol. 62 g of polyethylene are obtained in accordance with the following values:
productivity: 0.52 kg (expressed as kg of polyethylene per g of solid catalyst component),
yield: 1.6 kg (expressed as kg of polyethylene per g of hafnium in the solid catalyst component), The polymer produced in this manner has the following characteristics:
intrinsic viscosity: $[\eta]=4.1$ dl/g, measured in 1,2,4-trichlorobenzene (TCB) at 135° C.,
viscosity-average molecular weight: Mv=334,000, calculated in accordance with the equation:

$$[\eta]^{135°}\text{C.}_{TCB}=4.06\times10^{-4}\times(MV)^{0.725}$$

[ref: T. G. Scholte, N. L. J. Meijeriuk, H. M. Schofeleers and A. M. G. Brands, J. Appl. Polym. Sci. 29, 3763 (1984)],
percentage of crystallinity: 57%, determined as the ratio of $\Delta H$ of fusion of the sample expressed in Joules/g to the $\Delta H$ of fusion of a reference polyethylene having a $\Delta H$ of fusion of 290.37 Joules/g.
density: 0.9362 g/ml (ASTM-D 742).

EXAMPLE 19

1900 ml of anhydrous n-hexane, 1.2 g of triisobutyl aluminium and 0.12 g of the solid catalyst component prepared as in Example 1 are introduced in that order into a 5 liter stirred reactor. The reactor temperature is raised to 85° C. and the reactor pressurized with hydrogen to 5.8 ata and then with ethylene to 11 ata (hydrogen/ethylene molar ratio=1.29). Polymerization is carried out similarly to Example 18 for 4 hours to obtain 370 g of polyethylene with:
productivity: 3.1 kg,
yield: 9.1 kg (evaluated on the hafnium), The polymer has the following characteristics, determined as in Example 18:
intrinsic viscosity: 10.0 dl/g,
viscosity-average molecular weight: 1,150,000,
percentage of crystallinity: 52%,
density: 0.9305 g/ml.

EXAMPLE 20

1900 ml of anhydrous n-hexane, 1.2 g of triisobutyl aluminum and 0.12 g of the solid catalyst component prepared as in Example 1 are introduced in that order into a 5 liter stirred reactor. The reactor temperature is raised to 85° C. and the reactor pressurized with hydrogen to 3.0 ata and then with ethylene to 11 ata (hydrogen/ethylene molar ratio=0.41). Polymerization is carried out similarly to Example 18 for 4 hours to obtain 430 g of polyethylene with:
productivity: 3.6 kg,
yield: 11.0 kg (evaluated on the hafnium), The polymer has the following characteristics, determined as in Example 18:
intrinsic viscosity: 15.4 dl/g,
viscosity-average molecular weight: 2,070,000,
percentage of crystallinity: 50.1%,
density: 0.9290 g/ml.

EXAMPLE 21

1900 ml of anhydrous n-hexane, 8.8 g of triisobutyl aluminium and 0.006 g of the solid catalyst component prepared as described in Example 1 are introduced in that order into a 5 liter stirred reactor. The reactor temperature is raised to 85° C. and the reactor pressurized with hydrogen to 0.5 ata and then with ethylene to 6 ata (hydrogen/ethylene molar ratio=0.1). Polymerization is carried out similarly to Example 18 for 4 hours to obtain 180 g of polyethylene with:
productivity: 3.0 kg,
yield: 9.2 kg (evaluated on the hafnium), The polymer has the following characteristics, determined as in Example 18:
intrinsic viscosity: 25.0 dl/g,
viscosity-average molecular weight: 4,037,000,
percentage of crystallinity: 48%,
density: 0.9238 g/ml.

EXAMPLE 22

1900 ml of anhydrous n-hexane, 1.2 g of triisobutyl aluminum and 0.17 g of the solid catalyst component prepared as in Example 1 are introduced in that order into a 5 liter stirred reactor. The reactor temperature is raised to 75° C. and the reactor pressurized with hydrogen to 5.8 ata and then with ethylene to 11 ata (hydrogen/ethylene molar ratio=1.29). Polymerization is carried out similarly to Example 18 for 4 hours to obtain 370 g of polyethylene with:
productivity: 2.2 kg,
yield: 6.3 kg (evaluated on the hafnium), The polymer has the following characteristics, determined as in Example 18:
intrinsic viscosity: 12.0 dl/g,
viscosity-average molecular weight: 1,467,000,
percentage of crystallinity: 51.4%,
density: 0.9315 g/ml.

EXAMPLE 23

1900 ml of anhydrous n-hexane, 0.8 g of triisobutyl aluminium and 0.12 g of the solid catalyst component prepared as described in Example 2 are introduced in that order into a 5 liter stirred reactor. The reactor temperature is raised to 85° C. and the reactor pressurized with hydrogen to 3 ata and then with ethylene to 11 ata (hydrogen/ethylene molar ratio=0.41).

Polymerization is carried out similarly to Example 18 for 4 hours to obtain 572 g of polyethylene with:
productivity: 4.8 kg,
yield: 21.7 kg (evaluated on the zirconium), The polymer has the following characteristics, determined as in Example 18:
intrinsic viscosity: 5.6 dl/g,
viscosity-average molecular weight: 513,000.

EXAMPLE 24

2000 ml of anhydrous n-hexane, 1.19 g of triisobutyl aluminium and 219.4 g of the solid catalyst component prepared as described in Example 3 are introduced in that order into a 5 liter stirred reactor. The reactor temperature is raised to 85° C. and the reactor pressurized with hydrogen to 5.8 ata and then with ethylene to 12 ata. Polymerization is carried out similarly to Example 18 for 4 hours to obtain polyethylene with:
productivity: 1.313 kg,
yield: 7.95 kg (evaluated on the hafnium), The polymer has the following characteristics, determined as in Example 18:
intrinsic viscosity: 10.6 dl/g,
viscosity-average molecular weight: 1,236,000,
percentage of crystallinity: 57%,
density: 0.9320 g/ml.

EXAMPLE 25 (comparison)

1900 ml of anhydrous n-hexane, 0.4 g of triisobutyl aluminium and 3.2 mg of the solid catalyst component prepared as described in Example 5 are introduced in that order into a 5 liter stirred reactor. The reactor temperature is raised to 85° C. and the reactor pressurized with hydrogen to 0.5 ata and then with ethylene to 6 ata (hydrogen/ethylene molar ratio=0.1). Polymerization is carried out similarly to Example 18 for 4 hours to obtain 608 g of polyethylene with:
productivity: 190 kg,
yield: 1410 kg (evaluated on the titanium), The polymer has the following characteristics, determined as in Example 18:
intrinsic viscosity: 5.3 dl/g,
viscosity-average molecular weight: 463,000,
percentage of crystallinity: 54.2%,
density: 0.9374 g/ml.

EXAMPLE 26 (comparison)

1900 ml of anhydrous n-hexane, 0.4 g of triisobutyl aluminium and 3.2 mg of the solid catalyst component prepared as described in Example 5 are introduced in that order into a 5 liter stirred reactor. The reactor temperature is raised to 85° C. and the reactor pressurized with hydrogen to 5.8 ata and then with ethylene to 11 ata (hydrogen/ethylene molar ratio=1.29). Polymerization is carried out similarly to Example 18 for 4 hours to obtain 280 g of polyethylene with:
productivity: 87.5 kg,
yield: 625 kg (evaluated on the titanium), The polymer has the following characteristics, determined as in Example 18:
intrinsic viscosity: 1.2 dl/g,
viscosity-average molecular weight: 62,000,
percentage of crystallinity: 60.8%,
density: 0.956 g/ml.

We claim:

1. A catalyst component for the low-pressure polymerization of ethylene and $C_3$–$C_{10}$ alpha-olefins into very high molecular weight polyolefins, being in the form of a spherical granular solid of which at least about 80% of the granules have a size of between 30 and 40 microns, and having a surface area of between 20 and 40 $m^2/g$, a mean pore radius of between 5,000 and 40,000 Å and a porosity of between 40 and 90 vol % and being definable by the following formula (in atomic proportions):

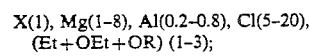

X(1), Mg(1–8), Al(0.2–0.8), Cl(5–20), (Et+OEt+OR) (1–3);

where:
X = Hf or Zr,
Et = ethyl group,
OEt = ethoxy group,
OR = alkoxy group containing from 3 to 8 carbon atoms in the linear or branched alkyl portion;

produced by a process comprising:
(a) spray drying an ethanolic magnesium chloride solution to form a spherical granular solid support containing between 5 and 30% w/w of alcoholic hydroxyls (expressed as ethanol);
(b) reacting said support, suspended in an inert organic liquid, with a hafnium or zirconium compound chosen from those hafnium or zirconium alkoxides and halogenalkoxides containing from 2 to 8 carbon atoms in the linear or branched alkyl portion, operating at a temperature of between 40° and 100° C. for a time between 0.5 and 4 hours, with an atomic Mg/Hf or Zr ratio of between 0.5/1 and 8/1;

(c) reacting the support treated in this manner with an alkyl aluminum chloride containing from 2 to 8 carbon atoms in the linear or branched alkyl portion, operating at a temperature of between 60° and 120° C. for a time of between 0.5 and 5 hours, with a ratio of chlorine atoms in the alkyl aluminum chloride to alkoxy groups of between 1/1 and 5/1; and (d) recovering the solid catalyst component from the relative suspension.

2. A catalyst component as claimed in claim 1 wherein X represents Hf and OR is the n-butoxy group.

3. A process for preparing a solid catalyst component comprising:

(a) spray drying an ethanolic magnesium chloride solution to form a spherical granular solid support containing between 5 and 30% w/w of alcoholic hydroxyls (expressed as ethanol);

(b) reacting said support, suspended in an inert organic liquid, with a hafnium or zirconium compound chosen from those hafnium or zirconium alkoxides and halogenalkoxides containing from 2 to 8 carbon atoms in the linear or branched alkyl portion, operating at a temperature of between 40° and 100° C. for a time of between 0.5 and 4 hours, with an atomic Mg/Hf or Zr ratio of between 0.5/1 and 8/1;

(c) reacting the support treated in this manner with an alkyl aluminum chloride containing from 2 to 8 carbon atoms in the linear or branched alkyl portions, operating at a temperature between 0.5 and 5 hours, with a ratio of chlorine atoms in the alkyl aluminum chloride to alkoxy groups between 1/1 and 5/1; and (d) recovering the solid catalyst component from the relative suspension.

4. A process as claimed in claim 3, characterised in that in the spray drying step the support which forms has an alcoholic hydroxyl content of the order of 20-25% w/w (expressed as ethanol)

5. A process as claimed in claim 3, characterised in that in the step involving reaction with the alkyl aluminium chloride, alkyl aluminium sesquichloride is used operating at a temperature of the order of 90° C. for a time of the order of 2 hours, with a ratio of chlorine atoms to alkoxy groups of the order of 3/1.

6. A catalyst for the polymerization of ethylene and $C_3$–$C_{10}$ alpha-olefins into very high molecular weight polyolefins, characterised by comprising the solid catalyst component claimed in claim 1 or 2 and a trialkyl aluminium or an alkyl aluminium chloride having from 2 to 8 carbon atoms in the alkyl portion, with an atomic ratio of aluminium in said trialkyl aluminium or alkyl aluminium chloride to hafnium or zirconium in the solid catalyst component of between 5/1 and 50/1.

7. A catalyst as claimed in claim 6, characterised in that the trialkyl aluminium is triethyl aluminium or triisobutyl aluminium.

* * * * *